(12) United States Patent
Kawase et al.

(10) Patent No.: US 6,494,003 B1
(45) Date of Patent: Dec. 17, 2002

(54) VEHICLE WINDOW GLASS AND METHOD OF PRODUCING THE SAME

(75) Inventors: Toyoo Kawase, Atsugi (JP); Kiyotaka Miyazawa, Atsugi (JP); Kazuhiko Takeuchi, Atsugi (JP); Kazuhiro Ichinohe, Atsugi (JP)

(73) Assignee: Hori Glass Co., Ltd., Kanagawa (JP)

( * ) Notice: Subject to any disclaimer, the term of this patent is extended or adjusted under 35 U.S.C. 154(b) by 0 days.

(21) Appl. No.: 09/686,812

(22) Filed: Oct. 12, 2000

(30) Foreign Application Priority Data

Mar. 24, 2000 (JP) ......................................... 2000-128627

(51) Int. Cl.[7] ............................................... B29C 45/14

(52) U.S. Cl. .............................. 52/204.62; 52/204.64; 52/209.69; 156/106; 156/107; 49/375

(58) Field of Search ................................. 156/106, 107; 52/204.62; 264/328.1

(56) References Cited

U.S. PATENT DOCUMENTS

| | | | | |
|---|---|---|---|---|
| 4,925,511 A | * | 5/1990 | Ikeda et al. | 156/106 |
| 6,015,475 A | * | 1/2000 | Hsieh et al. | 156/331.4 |
| 6,131,339 A | * | 10/2000 | Ramus | 49/375 |

* cited by examiner

Primary Examiner—Carl D. Friedman
Assistant Examiner—Basil Katcheves
(74) Attorney, Agent, or Firm—Greenblum & Bernstein, P.L.C.

(57) ABSTRACT

A vehicle window glass, comprising a vehicle window glass; a glass holder provided with a groove to which the vehicle window glass is inserted and held by being nipped and made by a resin material selected from groups of a natural grade of a polybutylene terephthalate resin or a natural grade of a polyethylene terephthalate resin, or a resin containing glass fibers in the natural grade of the polybutylene terephthalate resin or a resin containing glass fibers in the natural grade of the polyethylene terephthalate resin; and one-liquid type urethane adhesive layer containing a silane coupling agent formed between the vehicle window glass of the groove of said glass holder and the glass holder.

18 Claims, 1 Drawing Sheet

VEHICLE WINDOW GLASS AND METHOD OF PRODUCING THE SAME

BACKGROUND OF THE INVENTION

1. Field of the Invention

The present invention relates to window glass for vehicles assembled to an elevation apparatus and other apparatuses and a method of producing the same.

2. Description of the Related Art

As a means of assembling vehicle window glasses, there is known a glass holder structure using adhesives.

In a glass holder structure of this kind, a polyacetal resin or a polybutylene terephthalate resin containing glass fibers is used for a glass holder for holding a glass for a vehicle, a primer is applied on the glass side and on the glass holder side, one-liquid urethane adhesive or one-liquid silicone adhesive not containing silane coupling agent and two-liquid blending silicone are used for adhering for assembling.

The glass holder structure is for adhering a glass and a glass holder, but glasses are generally considered a hard to adhere material When assembling a vehicle window glass, it has been essential to use a primer for securing adhesive capability of the glass holder structure. The use of primer, however, requires a primer applying process, drying process and inspection process, and furthermore, a primer equipment and primer management. Also, means for improving the adhesive capability by using a primer requires a long time for the adhesives to set and a work for positioning a bracket requires a lot of efforts, which results in an increase in costs.

Furthermore, a work for applying the primer results in a bad working environment and deterioration in work efficiency due to the smell of the vaporized gas.

SUMMARY OF THE INVENTION

An object of the present invention is to provide a window glasses for vehicles capable of attaining a low production costs, high adhesive effects and a compact mounting members, and a method of producing the same.

To attain the above objects, according to the first aspect of the present invention, there is provided a vehicle window glass comprising a vehicle window glass; a glass holder having a groove in which said vehicle window glass is inserted to be held by being nipped made by a resin material of a natural grade of polybutylene terephthalate resin or a natural grade of polyethylene terephthalate resin, or a resin containing glass fibers in the natural grade of the polybutylene terephthalate resin or the natural grade of the polyethylene terephthalate resin; and one-liquid type urethane adhesive layer containing a silane coupling agent formed between the vehicle window glass of the groove of said glass holder and the glass holder.

Also, to attain the above object, according to the second aspect of the present invention, there is provided a method of producing a vehicle window glass by adhering with one-liquid type urethane adhesive layer containing a silane coupling agent a vehicle window glass and a glass holder having a groove in which said vehicle window glass is inserted to be held by being nipped made by a resin material of a natural grade of polybutylene terephthalate resin or a natural grade of polyethylene terephthalate resin, or a resin containing glass fibers in the natural grade of the polybutylene terephthalate resin or the natural grade of the polyethylene terephthalate resin.

On the surface of the vehicle window glass as one body to be adhered adsorbs water in the air wherein OH-group in the water and alkoxy-group in the silane coupling agent are bonded through a dehydrating condensation reaction.

The chemical structure of the polybutylene terephthalate resin or polyethylene terephthalate resin forming the glass holder as the other body to be adhered includes COO-group as a polar-group, thus, it is bonded with urethane bonding in the urethane sealant.

The one-liquid urethane sealant has isocyanate (NCO)-group at the end. After the isocyanate-group is bonded with water in the air, urea bonding is generated and hardened.

As a result, the vehicle window glass and the glass holder are rapidly and firmly adhered by the urethane sealant being added the silane coupling agent.

According to a vehicle window glass and a production method thereof of the present invention, it is possible to adhere between a vehicle glass and a glass holder furthermore firmly without using a glass primer nor a resin primer.

Also, a setting time of the adhesives, which has been long as a result of using a primer, can be made short. Accordingly, (1) abolition of primers on the glass side and on the resin side, (2) abolition of primer applying process, drying process, inspection process and equipments therefor, (3) abolition of primer management, (4) improvement of credibility in the market due to improvement in strength, (5) stabilization of quality and decrease in deficiency rate due to improvement of adhesive strength (particularly creep force) and reduction of unevenness in adhesive strength, (6) more compact members due to the improvement of adhesive strength, (7) reduction of adhering area due to an improvement of adhesive capability and (8) improvement of working environment by removing smells resulted from abolition of the primer applying process, can be attained and the economic effects is also large.

BRIEF DESCRIPTION OF THE DRAWINGS

These and other objects and features of the present invention will be explained in more detail below with reference to the attached drawing, wherein.

DESCRIPTION OF THE PREFERRED EMBODIMENTS

Figure 1:
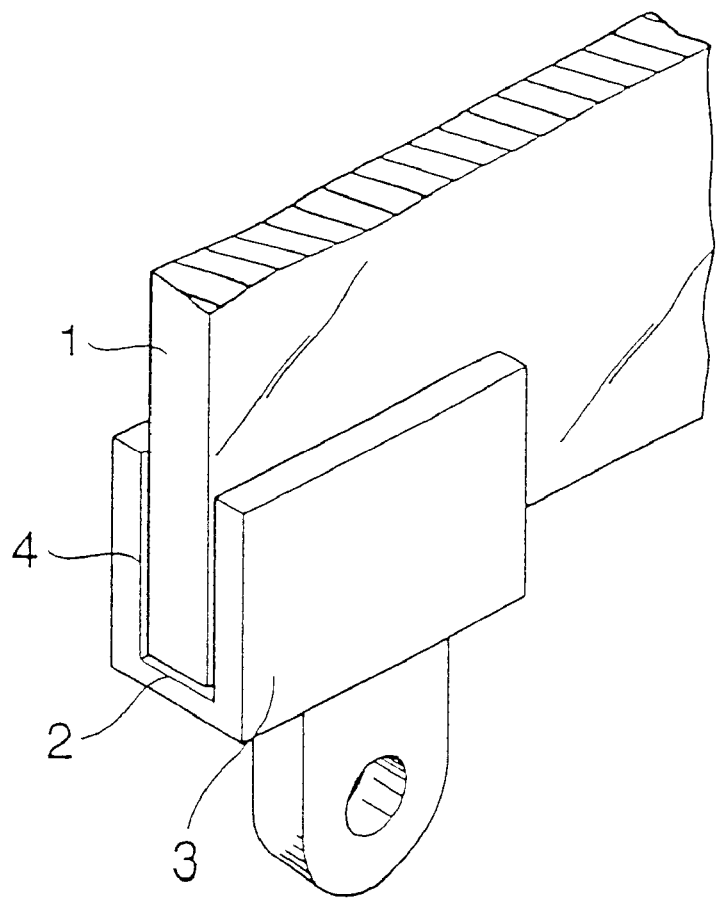
FIG. 1 is a perspective view of a core portion for explaining an adhering condition of a vehicle window glass and a glass holder in the present invention.

A vehicle window glass 1 is held nipped by a U-shaped groove 2 formed on a glass holder 3 and firmly adhered with an adhesive 4.

The glass holder 3 is formed by a composite resin containing glass fibers in a natural grade of polybutylene terephthalate resin as a resin material having COO-group as a polar-group or in a natural grade of a polybutylene terephthalate resin. Alternately, instead of the above, it may be formed by a composite resin containing glass fibers in a natural grade of a polyethylene terephthalate resin as a resin material having COO-group as a polar-group or in a natural grade of a polyethylene terephthalate resin.

As the adhesive 4, an urethane adhesive of one liquid type containing silane coupling agent is used.

In the polybutylene terephthalate composing the glass holder 3 and the urethane sealant composing the adhesive 4 are, as expressed by the chemical formula below, the COO-group as a polar-group and a urethane bonding in the urethane sealant are bonded, and the adhesive 4 is firmly adhered on an inner surface of the groove 2 on the glass holder 3.

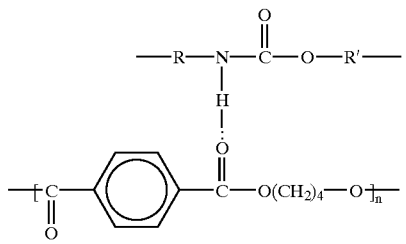

Next, adhering of silane coupling agent added urethane sealant on the vehicle window glass 1 will be explained.

The silane coupling agent added in the urethane sealant of one liquid type by the ratio of not more than 5 wt % is, as shown in the chemical formula below, composed of alkoxy-group (OR) extending from an organic functional-group (X) and a silicon atom (Si) at the ends.

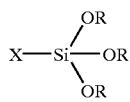

Bonding of the vehicle window glass 1 to be adhered and the silane coupling agent is attained by, as shown in the chemical formula below, just a little amount of adsorption of water in the air, and a dehydrating condensation reaction of OH-group in the adsorbed water and an alkoxy-group in the silane coupling agent added to the one-liquid urethane sealant to be siloxane.

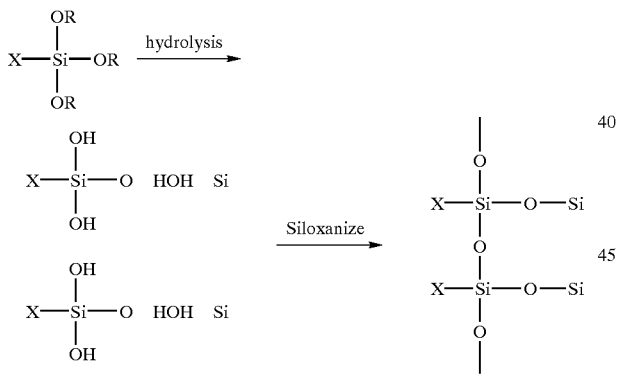

Therefore, the one-liquid urethane sealant is firmly adhered on the surface of the vehicle window glass 1 via the silane coupling agent.

As explained above, the one-liquid urethane sealant being added the silane coupling agent in the above way is firmly adhered both on the surface of the vehicle window glass 1 and on the groove 2 on the glass holder 3 holding by nipping the vehicle window glass.

Furthermore, since the one-liquid urethane sealant has isocyanate (NCO)-group at the end, it generates carbamic acid having a water in the air and bonded amine-group. The amine-group is hardened by urea bonding with urethane sealant which is yet to be bonded with water.

Note that the embodiments explained above were described to facilitate the understanding of the present invention and not to limit the present invention. Accordingly, elements disclosed in the above embodiments include all design modifications and equivalents belonging to the technical field of the present invention.

The present disclosure relates to subject matter contained in priority Japanese Patent Application No. 2000-128627, filed on Mar. 24, 2000, the contents of which are herein expressly incorporated by reference in its entirety.

What is claimed is:

1. A method of producing a vehicle window comprising:
   providing a window glass;
   providing a glass holder comprising a groove in which the glass is to be placed, the glass holder comprising a resin material selected from a natural grade of polybutylene terephthalate, a natural grade of polyethylene terephthalate, a natural grade of polybutylene terephthalate containing glass fibers, or a natural grade of polyethylene terephthalate containing glass fibers;
   providing a one-liquid adhesive comprising a urethane and a silane coupling agent; and
   adhering the glass to the holder groove using the adhesive.

2. The method of claim 1, wherein the resin material comprises a natural grade of polybutylene terephthalate.

3. The method of claim 1, wherein the resin material comprises a natural grade of polyethylene terephthalate.

4. The method of claim 1, wherein the resin material comprises a natural grade of polyethylene terephthalate containing glass fibers.

5. The method of claim 1, wherein the resin material comprises a natural grade of polyethylene terephthalate containing glass fibers.

6. The method of claim 1, wherein the silane coupling agent is present in the liquid in an amount of not more than about 5 wt %.

7. The method of claim 1, wherein the a primer is not applied.

8. The method of claim 6, wherein the a primer is not applied.

9. A vehicle window comprising:
   a window glass;
   a glass holder comprising a natural grade of polyethylene terephthalate resin material and a groove in which the glass is inserted to be held by being nipped; and
   a one-liquid adhesive layer formed between the groove and the glass by applying a liquid comprising a urethane and a silane coupling agent.

10. The vehicle window of claim 9, wherein the resin material comprises a natural grade of polyethylene terephthalate containing glass fibers.

11. The vehicle window of claim 9, wherein the silane coupling agent is present in the liquid in an amount of not more than about 5 wt %.

12. The vehicle window of claim 9, wherein the adhesive layer does not include a primer.

13. The vehicle window of claim 11, wherein the adhesive layer does not include a primer.

14. A vehicle window comprising:
   a window glass;
   a glass holder comprising a resin material selected from a natural grade of polybutylene terephthalate, a natural grade of polyethylene terephthalate, a natural grade of polybutylene terephthalate containing glass fibers, or a natural grade of polyethylene terephthalate containing glass fibers, and comprising a groove in which the glass is inserted to be held by being nipped, and;
   a one-liquid adhesive layer formed between the groove and the glass by applying a liquid comprising a urethane in combination with a silane coupling agent in an amount of not more than about 5 wt % of the liquid.

15. The vehicle window of claim 14, wherein the resin material comprises a natural grade of polyethylene terephthalate or a natural grade of polyethylene terephthalate containing glass fibers.

16. The vehicle window of claim 14, wherein the resin material comprises a natural grade of polybutylene terephthalate or a natural grade of polybutylene terephthalate containing glass fibers.

17. The vehicle window of claim 14, wherein the adhesive layer does not include a primer.

18. The vehicle window of claim 15, wherein the adhesive layer does not include a primer.

* * * * *

UNITED STATES PATENT AND TRADEMARK OFFICE
CERTIFICATE OF CORRECTION

PATENT NO.    : 6,494,003 B1
DATED         : December 17, 2002
INVENTOR(S)   : T. Kawase et al.

It is certified that error appears in the above-identified patent and that said Letters Patent is hereby corrected as shown below:

<u>Column 4,</u>
Line 26, "polyethylene" should be -- polybutylene --.

Signed and Sealed this

Twenty-seventh Day of January, 2004

JON W. DUDAS
*Acting Director of the United States Patent and Trademark Office*